United States Patent [19]

Williams

[11] Patent Number: 5,216,063

[45] Date of Patent: Jun. 1, 1993

[54] POLYAMIDE COMPOSITIONS

[75] Inventor: Richard S. Williams, Rugby, England

[73] Assignee: Bip Chemicals Limited, Manchester, England

[21] Appl. No.: 873,350

[22] Filed: Apr. 21, 1992

Related U.S. Application Data

[63] Continuation of Ser. No. 633,985, Dec. 26, 1990, abandoned.

[30] Foreign Application Priority Data

Jan. 13, 1990 [GB] United Kingdom ............... 9000804

[51] Int. Cl.$^5$ ................ C08K 3/32; C08K 3/26; C08K 3/22; C08L 31/04
[52] U.S. Cl. ................ 524/414; 524/436; 524/438; 524/706; 525/183
[58] Field of Search ............... 523/201; 524/414, 706, 524/436, 80, 438; 525/183

[56] References Cited

U.S. PATENT DOCUMENTS

| | | | |
|---|---|---|---|
| 3,778,407 | 12/1973 | Hild et al. | 524/414 |
| 4,185,044 | 1/1980 | Tacke et al. | 524/414 |
| 4,187,207 | 2/1980 | Cerny et al. | 524/414 |
| 4,471,080 | 9/1984 | Rinaldi et al. | 524/706 |
| 4,785,031 | 11/1988 | Scarso | 524/80 |
| 4,879,067 | 11/1989 | Sakon et al. | 428/407 |
| 4,970,255 | 11/1990 | Reiman et al. | 524/321 |

Primary Examiner—Paul R. Michl
Assistant Examiner—Peter Szekely
Attorney, Agent, or Firm—Nixon & Vanderhye

[57] ABSTRACT

A polyamide composition which comprises a thermoplastic polyamide red phosphorus and an olefin copolymer. The olefin copolymer is ungrafted and is a copolymer with units from ethylene and an unsaturated ester of a saturated $C_1$ to $C_4$ carboxylic acid.

The composition can also include a magnesium compound such as magnesium hydroxide or carbonate, and also reinforcing fibers or fillers such as glass fibers.

3 Claims, No Drawings

POLYAMIDE COMPOSITIONS

This is a continuation of application Ser. No. 07/633,985, filed Dec. 26, 1990, now abandoned.

This invention relates to polyamide compositions, and more particularly to such compositions which contain flame retardants.

In moulding compositions of polyamides such as nylon 6 and nylon 66 flame retardants are widely used materials. Red phosphorus may be used as a flame retardant in such compositions and its use in various compositions has been proposed. For example in published European Patent Application 0 303 031 A1 a polyamide moulding composition is proposed in which red phosphorus is used as a flame retardant and an olefin polymer of a specified type is also present as an additive to improve the flame resistance. The definition of the olefin polymer in this patent embraces a wide range of compounds which include copolymers containing units derived from a primary or secondary $C_1$-$C_{12}$ alkyl ester of acrylic or methacrylic acid or mixtures of such esters and/or units derived from an acid functional and/or latent acid functional monomer of an ethylene-unsaturated mono- or di-carboxylic acid. The example of olefin polymer given is an olefin polymer from 59.8% by weight ethylene, 35.0% by weight n-butylacrylate, 4.5% by weight acrylic acid and 0.7% by weight maleic anhydride.

Such olefin polymers are relatively expensive even if commercially available.

UK Patent No. 1,519,355 describes a thermoplastic nylon moulding material which comprises a nylon and a graft polymer of an α-olefin/vinyl ester copolymer with, as graft co-monomer component, from 0.5 to 10 percent by weight, based on the copolymer, of one or more polymerisable unsaturated carboxylic acids and/or one or more polymerisable unsaturated carboxylic acid esters. It is mentioned that red phosphorus can be used as a flame retardant in this composition but there is no suggestion that the flame retardant qualities of the composition can be improved by using red-phosphorus in conjunction with an olefin copolymer.

We have now found that certain ungrafted olefin copolymers can be used in conjunction with red phosphorus to obtain enhanced fire retardancy in a polyamide moulding composition.

According to the present invention a polyamide composition comprises a thermoplastic polyamide, red phosphorus and an olefin copolymer, said olefin copolymer being ungrafted and being copolymer of ethylene and an unsaturated ester of a saturated $C_1$ to $C_4$ carboxylic acid.

In said copolymer the proportion of said unsaturated ester may be in the range 5% by weight up to 50% by weight, and preferably said ester is a vinyl ester, more preferably vinyl acetate.

Preferably the polymer component of the polyamide composition contains 1 to 30% by weight of the olefin copolymer.

The thermoplastic polyamide is preferably an injection mouldable polymer with a melting point above 180° C. The preferred polymer is nylon 66, which may be used alone or in admixture with other polyamides such as nylon 6. Where a mixture is used the amount of the other polyamide mixed with the nylon 66 is preferably not more than 25% by weight of the polyamide.

As flame retardant red phosphorus is an essential ingredient of the polyamide composition but the red phosphorus is preferably treated in order to reduce its handling difficulties, since red phosphorus alone can be very dangerous in handling. Thus the red phosphorus may be carried on a polymeric carrier, and/or may be encapsulated with a suitable substance such as a polymer or resin.

Preferably the amount of red phosphorus in the composition is 1 to 15 per cent by weight of the total composition.

A preferred additional ingredient of the composition is a magnesium compound selected from magnesium hydroxide and magnesium carbonate and mixtures thereof.

Preferably the amount of such magnesium compound in the composition is 1 to 40 per cent by weight of the total composition.

At lower levels of addition the magnesium compound serves to stop corrosion of metal in contact with the composition, eg metal terminals in electrical fittings, and at the higher levels, eg 5 per cent by weight and above, the magnesium compound also enhances the flame retardant properties of the composition whilst maintaining high electrical tracking resistance.

The magnesium compound whether hydroxide or carbonate or a mixture thereof is used as a powdered solid material which may be an uncoated or coated commercial grade of material.

Unexpectedly, and despite its relative flammability, the ungrafted olefin copolymer has been found to improve the effectiveness of the flame retardant system based on the red phosphorus and especially when the system contains also magnesium hydroxide or carbonate.

The moulding compositions of this invention may contain reinforcing filler and/or fibres such as mineral reinforcing fibres. Preferably where mineral reinforcing fibres are used they are chopped glass fibres. The amount of reinforcing filler and/or fibres in the composition is preferably in the range 10 to 40 per cent by weight of the composition.

If desired other ingredients may also be added to the compositions of this invention, such as pigments, stabilisers, lubricants, mineral fillers etc, as is usual in a moulding composition.

We have found that in the manufacture of the compositions of this invention, when these contain a magnesium compound as mentioned above, it can be advantageous to keep apart the magnesium hydroxide or carbonate and the red phosphorus at least until the major work has been done in compounding the red phosphorus and, where used, reinforcing fillers or fibres into the polyamide.

The magnesium hydroxide and/or carbonate is preferably compounded with a polymer such as the ethylene copolymer or a polyamide separately to form a masterbatch of the magnesium compound in the polymer, e.g. 50/50 proportions.

The composition may be supplied as a mixture of granules of the masterbatch and compounded granules of all the other ingredients in polyamide. Alternatively the masterbatch of magnesium compound may be compounded into a pre-compounded mixture of the remainder of the ingredients, and a fully compounded composition supplied as normal.

Trials have shown that when the mixture of granules is supplied and used in a conventional injection moulding machine the masterbatch creates no difficulties and becomes fully integrated with the remainder of the composition.

The invention will now be described in more detail by means of examples.

EXAMPLES

Flammability Testing

The method used was the standard Underwriters Laboratories test method UL94. V0 means that the specimens burnt for less than 10 s after removal of flame, that the total burn time for ten applications of the flame on five specimens was less than 50 seconds. In addition no flaming drops are permitted. In V1 classification no specimen burns for longer than 30 seconds after the application of the flame and the total burning time for 10 specimens is less than 250 seconds. No flaming drops are permitted. The same criteria apply in V2 classification except that some flaming drops are permitted.

In addition to these classifications, the average burning time for each application of flame was calculated and the occurrence of non-flaming drops was noted (10 specimens).

EXAMPLES 1 AND 2

Two compositions of nylon 66 were prepared with and without olefin copolymer for comparison.

Masterbatches of magnesium hydroxide were made by first blending the ingredients of the masterbatches shown in Table II, then feeding the mixture through a 30 mm co-rotating twin-screw extruder.

The compositions were then fully compounded in a Baker Perkins twin-screw extruder in accordance with the formulations shown in Table I when the masterbatches listed are those described in Table II.

In each example the red phosphorus used was encapsulated in a polyamide carrier (70% by weight of red phosphorus). The magnesium hydroxide used was uncoated grade 200-06 (ex Cooksons) and the glass fibres were grade R23D from Owens Corning Fibreglass, chop length 4.5 mm. In Example 1 the magnesium hydroxide was masterbatched in nylon 6, whereas in Example 2 the magnesium hydroxide was able to be masterbatched in ethylene/vinyl acetate copolymer. (The ethylene/vinyl acetate copolymer used was LACQTENE V grade 8458 commercially available from Atochem Limited.)

TABLE I

| Example No | 1 | 2 |
|---|---|---|
| Nylon 66 | 47.8 | 43.8 |
| Glass Fibre | 25.0 | 25.0 |
| 70% Red Phosphorus in polyamide carrier | 7.2 | 7.2 |
| Nylon 6 | — | 8.0 |
| Masterbatch 1 | 20.0 | — |
| Masterbatch 2 | — | 16.0 |

TABLE II

| Masterbatch No | 1 | 2 |
|---|---|---|
| Nylon 6 | 50.0 | — |
| Magnesium Hydroxide | 50.0 | 60.0 |
| Ethylene/Vinyl Acetate Copolymer | — | 40.0 |

Moulded samples were prepared by injection moulding of the compositions of Examples 1 and 2.

Table III below shows the results of the flammability testing on moulded samples.

TABLE III

| Example No | 1 | 2 |
|---|---|---|
| UL94 test rating | | |
| Class 3 mm | V0 | V0 |
| Average Burn Time (secs) | 1 | 0.7 |
| Class 1.5 mm | Fail | V0 |
| Average Burn Time (secs) | >30 | 0.8 |

There was no dripping in any of these tests with either composition.

It will be seen that the presence of the olefin copolymer in Example 2 has resulted in the poor performance at 1.5 mm being converted to a V0 rating.

EXAMPLES 3 AND 4

In these two examples comparable compositions of nylon 66 were prepared with and without olefin copolymer, but a two component method of manufacture was used.

Components 1 and 2 of the compositions were prepared with the formulations shown in Table IV by first blending the ingredients and then compounding the blend in a 30 mm twinscrew extruder.

The red phosphorus, magnesium hydroxide, glass fibres and ethylene/vinyl acetate copolymer were the same grades as used in the previous examples.

TABLE IV

| | Component 1 | |
|---|---|---|
| Example No | | 3 and 4 |
| Nylon 66 | | 55.0 |
| Glass Fibre | | 31.7 |
| 70% Red P in polyamide carrier | | 9.1 |
| Carbon Black masterbatch in nylon 6 (25/75 by wt C/Nylon) | | 3.8 |
| Silicone lubricant | | 0.25 |
| | Component 2 | |
| Example No | 3 | 4 |
| Nylon 6 | 50.0 | — |
| Magnesium Hydroxide | 50.0 | 60.0 |
| Ethylene/Vinyl Acetate copolymer | — | 40.0 |

Moulding Trials were carried out for both Examples by blending granules of components 1 and 2 and feeding the blended granules to an injection moulding machine.

In Example 3, 80 parts of component 1 were blended with 20 parts of component 2 and in Example 4, 84 parts by weight of component 1 were blended with 16 parts by weight of component 2.

Table V shows the results of the flammability testing on moulded samples.

TABLE V

| Example No | 3 | 4 |
|---|---|---|
| UL94 test rating | | |
| Class 3 mm | V0 | V0 |
| Average Burn Time (secs) | 0.9 | 0.0 |
| Class 1.5 mm | Fail | V0 |
| Average Burn Time (secs) | >30 | 0.1 |

There was no dripping in any of these tests in either Example.

Again it will be seen that in Example 4 the presence of the olefin copolymer has resulted in a V0 rating being obtained at 1.5 mm in contrast to the fail with Example 3.

I claim:

1. A process for preparing an injection moldable polyamide composition comprising the steps of:
   A. preparing a masterbatch by blending together:
      (1) a magnesium compound selected from the group consisting of magnesium hydroxide and magnesium carbonate and mixtures thereof in an amount forming 1-40% by weight of the composition, and
      (2) an ungrafted copolymer of ethylene and vinyl acetate in an amount forming 1-30% by weight of the amount of polyamide plus said copolymer, the vinyl acetate component forming 5-50% by weight of said polymer; and thereafter
   B. compounding the mixture prepared in Step A with the following:
      (1) nylon 66, alone or in admixture with another injection-moldable thermoplastic polyamide with a melting point above 180° C.;
      (2) red phosphorus in an amount forming 1-15% by weight of the composition; and
      (3) glass fiber reinforcement in an amount forming 10-40% by weight of the composition to produce a flame resistant, injection moldable polyamide.

2. The process of claim 1 in which the thermoplastic polyamide is a mixture of nylon 66 and nylon 6, which includes not more than 25% by weight of the nylon 6.

3. An injection moldable polyamide composition produced by the process of claim 1.

* * * * *